United States Patent [19]

Howell

[11] 3,783,245

[45] Jan. 1, 1974

[54] DATA CODING SYSTEMS

[75] Inventor: John Stuart Howell, Broadstone, England

[73] Assignee: Plessey Handel Und Investments AG, Zug, Switzerland

[22] Filed: Oct. 12, 1971

[21] Appl. No.: 188,695

[30] Foreign Application Priority Data

| | | |
|---|---|---|
| Oct. 13, 1970 | Great Britain | 48,674/70 |
| Dec. 22, 1970 | Great Britain | 60,731/70 |

[52] U.S. Cl. ....... 235/61.11 E, 235/61.12 N, 250/219 DC, 340/146.3 K

[51] Int. Cl. .. G06k 7/14, G06k 19/06, G01n 21/30, G06k 9/13

[58] Field of Search ....... 340/146.3 K, 347 DD; 235/61.12 N, 61.12 R, 61.11 E, 61.11 D; 250/219 DC

[56] References Cited

UNITED STATES PATENTS

| | | | |
|---|---|---|---|
| 3,701,886 | 10/1972 | Jones | 235/61.11 E |
| 3,304,542 | 2/1967 | Sutton | 340/347 DD |
| 3,553,438 | 1/1971 | Blitz | 235/61.11 E |
| 3,543,007 | 11/1970 | Brinker | 235/61.11 E |
| 3,636,317 | 1/1972 | Torret | 235/61.12 N |
| 3,418,456 | 12/1968 | Hamisch | 235/61.11 E |
| 3,643,068 | 2/1972 | Mohan | 235/61.11 E |
| 3,617,707 | 11/1971 | Shields | 235/61.11 E |

*Primary Examiner*—Maynard R. Wilbur
*Assistant Examiner*—Robert M. Kilgore
*Attorney*—Samuel Scrivener, Jr. et al.

[57] ABSTRACT

An optical coding system in which data is presented in the form of printed blocks and wherein data significance, i.e., 'mark' or 'space,' is determined by the width of the block relative to the width of an adjacent space or unprinted region.

2 Claims, 4 Drawing Figures

DATA CODING SYSTEMS

Figure 1:
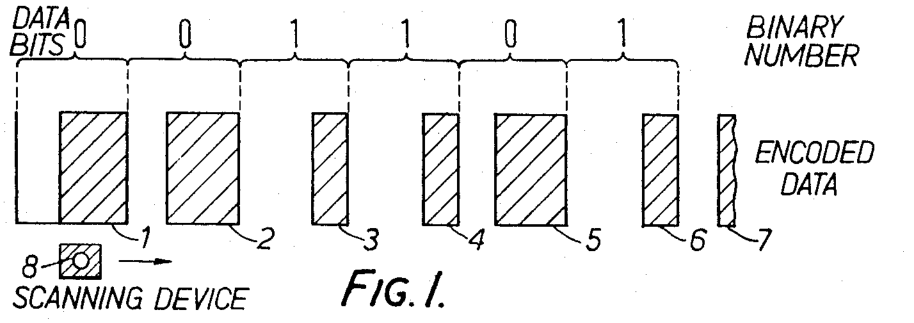

This invention relates to data code reader systems and more especially it relates to systems which utilise optical coding.

An optical coding system is a system in which data is presented in the form of characters, bars, blocks or elements which may be printed, for example, having predetermined light reflectivity or colour and which are scanned by optical sensor means for data reading purposes. "According to the present invention a data code reader system for reading data represented in the form of a number of pairs of optically recognisable elements arranged in line, the elements of a pair having different relative reflectivity, colour or shade, the significance of a pair (i.e., mark or space) being determined by the relative width of the elements of the pair comprises, light sensitive code reading means for producing a video waveform as data represented by said elements is scanned the video waveform being utilised to gate pulses from a clock pulse generator to counter means, pulses counted during scanning of one element of a pair being compared with the number of pulses counted during scanning of the other element of the pair to provide an indication of the significance of data represented by that pair." It will be appreciated that the word 'coloured' when used herein may include black or white.

In one contemplated system a wide dark element followed by a narrow light element represents a 'mark' or binary '1' signal and conversely a narrow dark element followed by a wide light element represents a 'space' space or binary '0' signal. In an alternative system a wide dark element followed by a narrow light element represents a 'space' or binary '0' signal, and a narrow dark element followed by a wide light element represents a 'mark' or binary '1' signal.

In operation of the system, data represented as aforesaid may be scanned by a hand held light sensitive probe or pen like device incorporating as an active element a photo diode for example light reflected from data representative elements being arranged to fall on the active element thereby to produce a resulting video waveform The resulting video waveform produced as just before described is utilised to gate pulses to a counter such that the signifiance of data is determined in accordance with the number of clock pulses counted as a dark element is scanned compared with the number of clock pulses counted as a corresponding associated light element is scanned. In one digital system a counter may be utilised which is zeroed consequent upon the transistion from a light to a dark element and which is arranged to count clock pulses during the dark element scanning time and which is triggered consequent upon the transition from the dark to its associated light element to count clock pulses in reverse towards zero. Thus the count state just before the next transition from a light to a dark element will be indicative of the width of the light element as compared with its associated dark element and thus the count state will be indicative of the significance of data represented.

It will be appreciated that in dependence upon the design philosophy of the system, the counter may alternatively be zeroed consequent upon the detection of the transition from a dark to light element and in this case the counter will be arranged to count up during the scanning of light elements and down during the scanning of dark elements.

It will also be appreciated that the clock pulse frequency must be determined in accordance with the fastest scanning rate envisaged such that a significant number of clock pulses can always be counted when a narrow element is scanned at the fastest speed envisaged.

A system according to the present invention has the advantage that data may be read accurately independently of ordinary variations in scanning speed even if these variations occur during one scanning operation providing the speed at which adjacent associated dark and light elements are scanned is substantially the same and since it is arranged that the width of the elements is comparatively small this requirement will always be satisfied in practice. A further advantage of the system is that it has no need of strobe bars or timing characters in addition to data or other information elements such as check or start codes.

Figure 2:
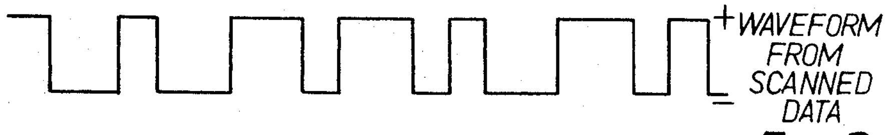
Figure 3:
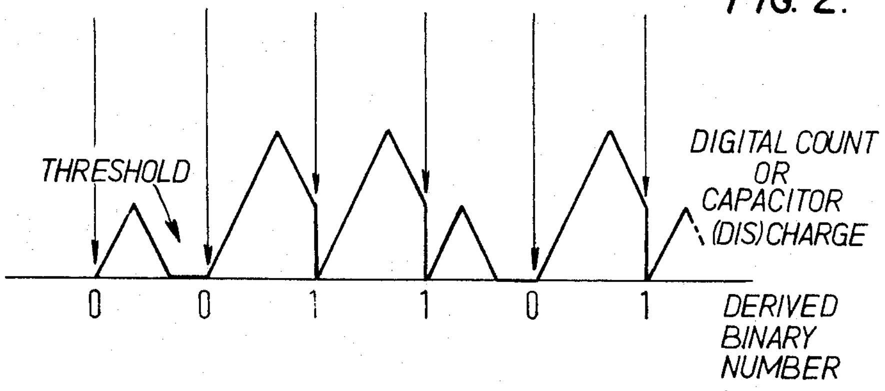
Figure 4:
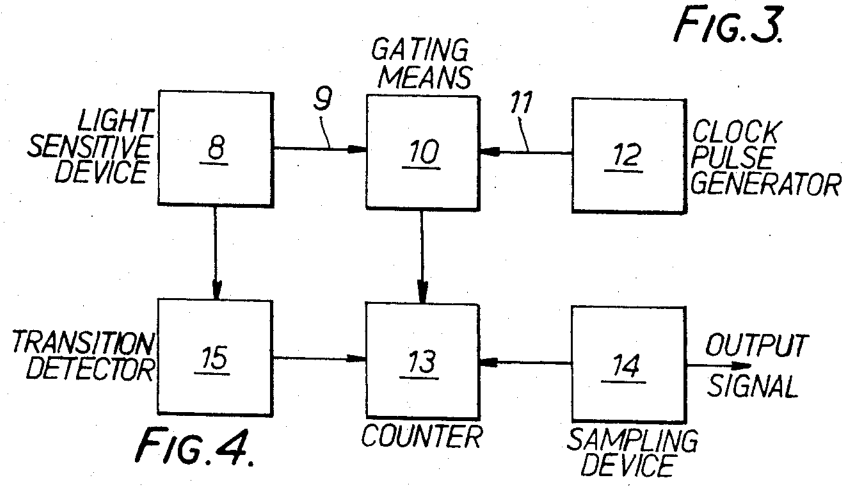

The foregoing and other features of the invention will be better understood from the following description of some exemplary embodiments of the invention wherein reference is made to the accompanying drawings, in which:

FIG. 1 is a block schematic diagram of a number of optically recognisable elements representative of a binary number, FIG. 2 is a video waveform resulting from scanning the waveform of the blocks of FIG. 1 with a pen like probe or light pen, FIG. 3 is a waveform diagram showing the changing count state of a counter and FIG. 4 is a block schematic diagram of one system according to the present invention.

Referring now to the drawings a binary number 0,0,1,1,0,1, is represented by printed blocks 1, 2, 3, 4, 5, 6, and 7. A wide printed block preceded by a narrow space is representative of a binary '0' signal and a narrow printed block preceded by a wide space is representative of a binary '1' signal. The blocks 1 to 7 are scanned by a scanning device incorporated in a hand held light pen shown schematically at 8.

The present system the waveform of FIG. 2 may be utilised to gate pulses from a clock pulse generator to a counter. The counter may be arranged to 'empty' to a zero state when a positive to negative transition is detected in the waveform of FIG. 2 and thereafter to begin counting clock pulses until a negative to positive transition is detected at which time it is a arranged to count in reverse towards zero. When the next positive to negative transition is detected the count state is interrogated just prior to the count zeroing operation. In the illustrated example if the counter has reached zero at the instant of recognition a '0' or 'space' bit is read or if at the instant of recognition zero has not been reached a '1' or 'mark' bit is read.

Although in the foregoing example sampling is effected at transitions between black and white, it will be appreciated that in an alternative arrangement a binary '1' signal may be represented by a wide printed block followed by a narrow space and a binary '0' signal would be represented by a narrow printed block followed by a wide space. In this system sampling is arranged to take place at the white/black transitions the sampled count being subsequently cleared. The first transition at the start of a pattern is ignored in such a system.

Labels, tags or markers carrying codes produced in accordance with the present invention may be used to identify articles such as library books or articles of grocery. The labels or tags may then be interrogated and data fed to a computer and/or used to initiate a "printout."

It is contemplated that the code may be so arranged as to facilitate reading in both directions thus an article may be identified by scanning a code printed on a label attached thereto even when the article and label is scanning upside down.

It is also envisaged that labels may also carry in addition to coded data plain printed language. The plain language may be visible to the eye but of a colour not detectable to the code reader thereby avoiding interference and/or the coded bars may be invisible to the eye although recognisable by code reading apparatus.

What we claim is:

1. A data code reader system for reading data represented in the form of a number of pairs of optically recognisable elements arranged in line, the elements of a pair having different relative reflectivity shade or colour, the significance of a pair (i.e., mark or space) being determined by the relative width of the elements of a pair, comprising light sensitive code reading means for producing a video waveform as data represented by said elements is scanned, the video waveform being utilised to gate pulses from a clock pulse generator to counter means, pulses counted during scanning of one element of a pair being compared with the number of pulses counted during scanning of the other element of the pair to provide an indication of the significance of data represented by that pair, the counter means being zeroed consequent upon the detection of a transmission from a light to a dark element and arranged to count up clock pulses during a dark element and triggered consequent upon the transition from a dark to a light element of a pair to count down clock pulses towards zero, the count stste just before the next successive zeroing operation being indicative of the significance of data represented by the elements of a pair.

2. A data code reading system for reading data represented in the form of a number of pairs of optically recognisable elements arranged in line, the elements of a pair having different relative reflectivity shade or colour, the significance of a pair (i.e., mark or space) being determined by the relative width of the elements of a pair, comprising light sensitive code reading means for producing a video waveform as data represented by said elements is scanned, the video waveform being utilised to gate pulses from a clock pulse generator to counter means, pulses counted during scanning of one element of a pair being compared with the number of pulses counted during scanning of the other element of the pair to provide an indication of the significance of data represented by that pair, wherein the counter is zeroed consequent upon the detection of a transition from a dark to a light element of a pair and thereafter arranged to count clock pulses from the clock pulse generator until the detection of a transition from a light to a dark element, whereupon the counter is arranged to count down towards zero for a period during which the light element is scanned, the count state being interrogated just before the counter is zeroed consequent upon the detection of the next transition from a dark to a light element, the interrogated count state being indicative of the significance of data represented by the elements of the pair.

* * * * *